United States Patent
Drechsler et al.

(10) Patent No.: US 6,940,414 B2
(45) Date of Patent: Sep. 6, 2005

(54) PRESSURE SWITCH WITH ELECTRICAL CORRECTION SIGNAL FOR ADJUSTING THRESHOLD VALUES

(75) Inventors: Rainer Drechsler, Lohr am Main (DE); Wolfgang Lukasczyk, Lohr am Main (DE)

(73) Assignee: Bosch Rexroth AG, Lohr/Main (DE)

( * ) Notice: Subject to any disclaimer, the term of this patent is extended or adjusted under 35 U.S.C. 154(b) by 407 days.

(21) Appl. No.: 10/203,499
(22) PCT Filed: Feb. 9, 2001
(86) PCT No.: PCT/EP01/01413
§ 371 (c)(1), (2), (4) Date: Aug. 9, 2002
(87) PCT Pub. No.: WO01/63235
PCT Pub. Date: Aug. 30, 2001

(65) Prior Publication Data
US 2003/0089176 A1 May 15, 2003

(30) Foreign Application Priority Data
Feb. 26, 2000 (DE) .......................... 100 09 194

(51) Int. Cl.$^7$ .............................................. G08B 21/00
(52) U.S. Cl. ..................... 340/644; 340/626; 307/139; 307/144; 73/708; 73/700; 137/557
(58) Field of Search ..................... 340/644, 660–664, 340/603, 507, 555, 611, 614, 665; 307/9.1, 144, 118; 73/700, 708, 23.2, 733, 732, 37; 123/146.5; 200/81 R, 701, 82, 83 R, 83 J, 83 P; 137/557

(56) References Cited

U.S. PATENT DOCUMENTS

| | | | |
|---|---|---|---|
| 4,091,658 A | * | 5/1978 | Covington et al. ...... 73/40.5 R |
| 4,388,505 A | | 6/1983 | Sarian et al. |
| 5,117,675 A | * | 6/1992 | Notoyama et al. ............. 73/37 |
| 5,542,287 A | | 8/1996 | Powers |
| 5,675,317 A | * | 10/1997 | Ichikawa et al. ........... 340/507 |
| 5,982,047 A | * | 11/1999 | Probst et al. ................. 307/9.1 |
| 6,429,548 B1 | * | 8/2002 | Wagner et al. .............. 307/118 |

FOREIGN PATENT DOCUMENTS

| | | |
|---|---|---|
| DE | 4036564 | 5/1992 |
| DE | 4113563 | 10/1992 |
| DE | 4204060 | 8/1993 |
| DE | 19637607 | 3/1998 |
| DE | 19818070 | 11/1999 |
| EP | 0292606 | 11/1988 |
| EP | 0711984 | 5/1996 |
| EP | 0805349 | 11/1997 |
| EP | 0829711 | 3/1998 |
| GB | 2125555 | 3/1984 |

OTHER PUBLICATIONS

Patent Abstracts of Japan, vol. 015, No. 251 (P–1220), Jun. 26, 1991 & JP 03 081634 A (SMC Corp), Apr. 8, 1991.

* cited by examiner

*Primary Examiner*—Jeffery Hofsass
*Assistant Examiner*—Eric Blount
(74) *Attorney, Agent, or Firm*—Martin A. Farber

(57) ABSTRACT

In a pressure switch, which emits an electrical switching signal as a function of the magnitude of a pressure which is supplied to it, which electrical switching signal assumes a first value when the pressure is less than the threshold value and which assumes a second value when the value is greater than the threshold value, the threshold value is adjusted—assuming that this is provided at all—by hand, for example by moving a cam disk which is coupled to a rotary knob. In order to adjust the threshold value by an electrical signal, the pressure is supplied to a pressure sensor, which emits an electrical output signal, which is a measure of the pressure which is supplied to the pressure sensor. The pressure switch is supplied with an electrical input signal which is a measure of the threshold value. The electrical output signal from the pressure sensor and the electrical input signal are supplied to a logic circuit, which emits an electrical switching signal which assumes one of two values as a function of the magnitude of the difference between the electrical signals which are supplied to it. The pressure switch is used generally for signaling on reaching a pressure which can be preselected. The pressure switch is used in particular in automation devices.

12 Claims, 3 Drawing Sheets

PRESSURE SWITCH WITH ELECTRICAL CORRECTION SIGNAL FOR ADJUSTING THRESHOLD VALUES

FIELD AND BACKGROUND OF THE INVENTION

The invention relates to a pressure switch, which emits an electrical switching signal as a function of the magnitude of a pressure which is supplied to it, which electrical switching signal assumes a first value when the pressure is less than an adjustable threshold value, and assumes a second value when the pressure is greater than the threshold value.

A pressure switch such as this is known from U.S. Pat. No. 4,388,505. The threshold value, that is to say that pressure at which the electrical output signal changes, can be adjusted by rotation of a cam disk. A manually adjustable rotary knob is provided in order to rotate the cam disk, and has markings for various threshold value magnitudes. No provision is made for the threshold value to be changed by signals from a control device.

SUMMARY OF THE INVENTION

The invention is based on the object of providing a pressure switch of the type mentioned initially, whose threshold value can be adjusted by means of an electrical control signal.

The invention makes it possible to set the threshold value on the basis of an electrical output signal from a higher-level control device.

Advantageous developments of the invention are provided. In order that pressure signals on which small amplitude pressure fluctuations are superimposed during operation do not initiate switching processes caused by the pressure fluctuations, the logic circuit for the electrical input signal and for the electrical output signal from the pressure sensor is also supplied with a correction signal, which shifts the pressure at which the switching process takes place with respect to the threshold value which is predetermined by the electrical input signal. If the switching process is intended to be initiated only at a pressure which is greater than the threshold value, the correction signal acts as an increase in the threshold value. If, on the other hand, the switching process is in fact intended to be initiated at a pressure which is less than the threshold value, the correction signal acts as a reduction in the threshold value. In this case, the correction signal may be constant or may depend on the magnitude of the pressure to be monitored. If the logic circuit is supplied with a second correction signal in addition to the first correction signal, two different switching points can be provided. It is thus possible to initiate a switching process not only at a pressure which is greater than the threshold value, but also at a pressure which is less than the threshold value. It is thus possible, for example when monitoring the operating pressure of a clamping system by means of a pressure switch, to at the same time monitor whether a minimum pressure, which is required for secure clamping of a work piece, exists, and whether the pressure is less than a maximum pressure, which would lead to damage to the work piece. A constant correction signal can advantageously be derived from a supply voltage which is provided to the pressure switch in order to supply the pressure sensor and the logic circuit.

A pressure switch such as this may advantageously be used in order to monitor the operating pressure of a hydraulic load in a machine tool, in particular in clamping systems with hydraulic cylinders for operating a chuck or the tail spindle of a tailstock. In this case, the nominal value signal which is supplied to the drive electronics for the valve from a higher-level machine controller is also supplied as an electrical input signal to the pressure switch. The electrical switching signal from the pressure switch is supplied to the higher-level machine controller. In a corresponding way, in the case of a pressure switch with two electrical switching signals, both switching signals are supplied to the machine controller. This pressure monitoring arrangement has the advantage that the pressure monitoring can be carried out independently of the valve control. However, in this case, the switching threshold of the pressure switch is also driven by the control signal for valve control. The higher-level machine controller evaluates the switching signals from the pressure switch and initiates safety-relevant measures if the operating pressure exceeds the predetermined limits in one direction or the other direction.

BRIEF DESCRIPTION OF THE DRAWINGS

The invention will be explained in more detail in the following text, together with its further details, on the basis of exemplary embodiments which are illustrated in the drawings, in which.

DETAILED DESCRIPTION OF THE PREFERRED EMBODIMENT

Figure 1:
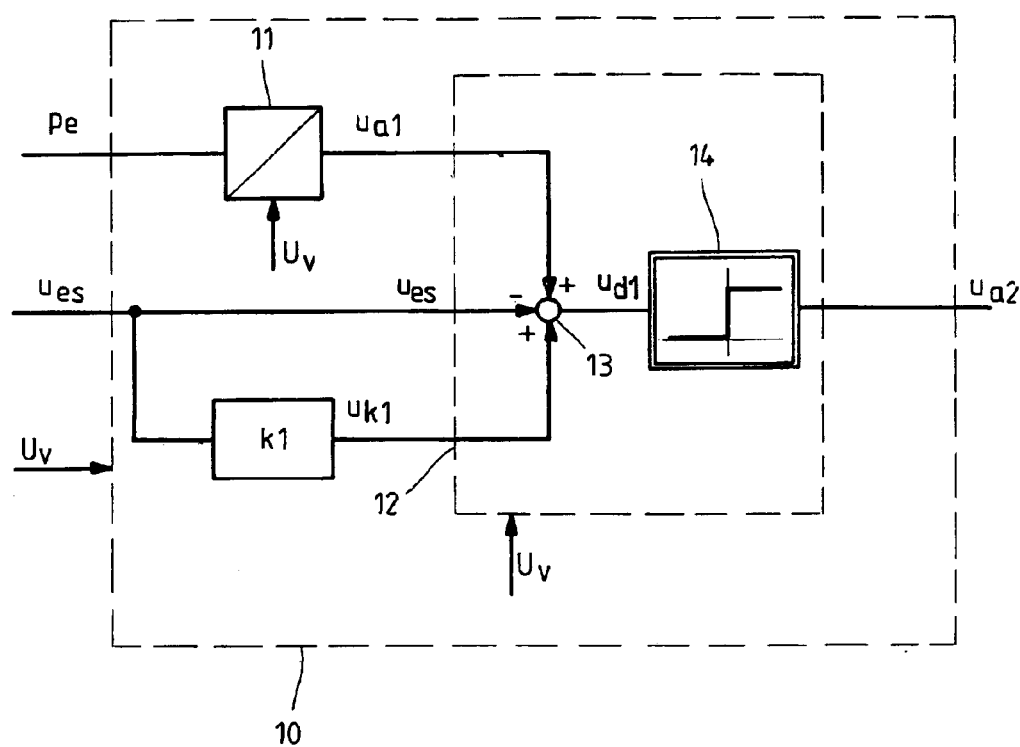
FIG. 1 shows the block diagram of a pressure switch having one switching output.

FIG. 1 shows the block diagram of a pressure switch according to the invention, having one electrical switching output. The pressure switch is annotated by the reference symbol 10. The pressure switch 10 is supplied with a pressure pe, which is to be monitored, as the input variable. A pressure sensor 11 converts the pressure pe to a voltage ua1. The magnitude of the voltage ua1 is a measure of the pressure pe. In the exemplary embodiment under consideration here, the voltage ua1 is assumed to be proportional to the pressure pe. The output voltage ua1 from the pressure sensor 11 is supplied as an input signal to a logic circuit 12. Other input signals to the logic circuit 12 are a voltage ues and an voltage uk1. The voltage ues is a measure of the threshold value of the pressure switch 10, which is referred to by ps in the following text. The voltage uk1 is the product of the voltage ues and a factor k1. The logic circuit 12 comprises an addition element 13 and a switching element 14, which is downstream from it. The output signal from the addition element 13 is a voltage ud1. This voltage is supplied as an input signal to the switching element 14. The output signal from the switching element 14 is a voltage ua2. The voltage ua2 assumes a first value ua20 when the voltage ud1 which is supplied to the switching element 14 is negative, and it assumes a second value ua21 when the voltage ud1 which is supplied to the switching element 14 is positive. The voltage ua2 of the switching element 14 is the output signal from the logic circuit 12, and also the output signal from the pressure switch 10. The pressure switch 10 is supplied with a voltage Uv, which is used as a supply voltage for the pressure sensor 11 and for the logic circuit 12. The voltage Uv is either a constant voltage, or may vary about a nominal value within a tolerance band.

First of all, it is assumed that the factor k1 is equal to zero. The voltage uk1 is thus also equal to zero. In this case, the addition element 13 forms only the difference between the voltage ua1 and the voltage ues, that is to say the voltage ud1 which is supplied to the switching element 14 is defined by the relationship ud1=ua1−ues. The voltage ud1 is negative when the pressure pe which is supplied to the pressure sensor 11 is less than the threshold value ps. In this case, the voltage ua1 is less than the voltage ues. As stated above, the voltage ua2 assumes the value ua20 for negative values of ud1. The voltage ud1 is, on the other hand, positive when the pressure pe which is applied to the pressure sensor 11 is greater than the threshold value ps. In this case, the voltage ua1 is greater than the voltage ues, and the voltage ud1 is positive. The voltage ua2 assumes the value ua21. The threshold value ps for the pressure pe which is to be monitored can be varied easily by varying the voltage ues. Since there is a fixed relationship between the pressure pe and the output voltage ua1 from the pressure sensor 11, each pressure value pe can be associated with a corresponding value of the voltage ues. In this case, there is no need to set the threshold value on the pressure switch itself, and the threshold value can be predetermined by remote control, for example on a higher-level control device.

In situations in which small amplitude pressure fluctuations are superimposed on the pressure to be monitored during operation, the invention allows the threshold value ps to be set on the basis of the mean value, over time, of the pressure to be monitored. However, in order to avoid initiating a switching process whenever the mean value is undershot, the addition element 13 is also supplied with the voltage uk1 with a negative mathematical sign, as a correction signal. This is done by choosing the factor k1 to have a value greater than zero. The voltage uk1 acts like a reduction in the voltage ues. Since the voltage uk1 is proportional to the voltage ues, its correction effect is greater for high values of the voltage ues than for small values. If such a relationship between the correction voltage uk1 and the voltage ues is undesirable, it is also possible—as described further below with reference to FIG. 2—to supply the addition element 13 with a constant correction voltage. If the correction voltage uk1 is supplied to the addition element 13 with a positive mathematical sign rather than with a negative mathematical sign—as illustrated in FIG. 1—the switching point of the pressure switch 10 is shifted to values which are greater than the threshold value which corresponds to the voltage ues. A correction such as this makes it possible to monitor a pressure on which small amplitude pressure fluctuations are superimposed for overshoots, that is to say the switching process of the pressure switch 10 is initiated only when the instantaneous value of the pressure pe exceeds a value which is greater than the mean value, over time, of the pressure to be monitored by a value that is governed by the factor k1.

Figure 2:
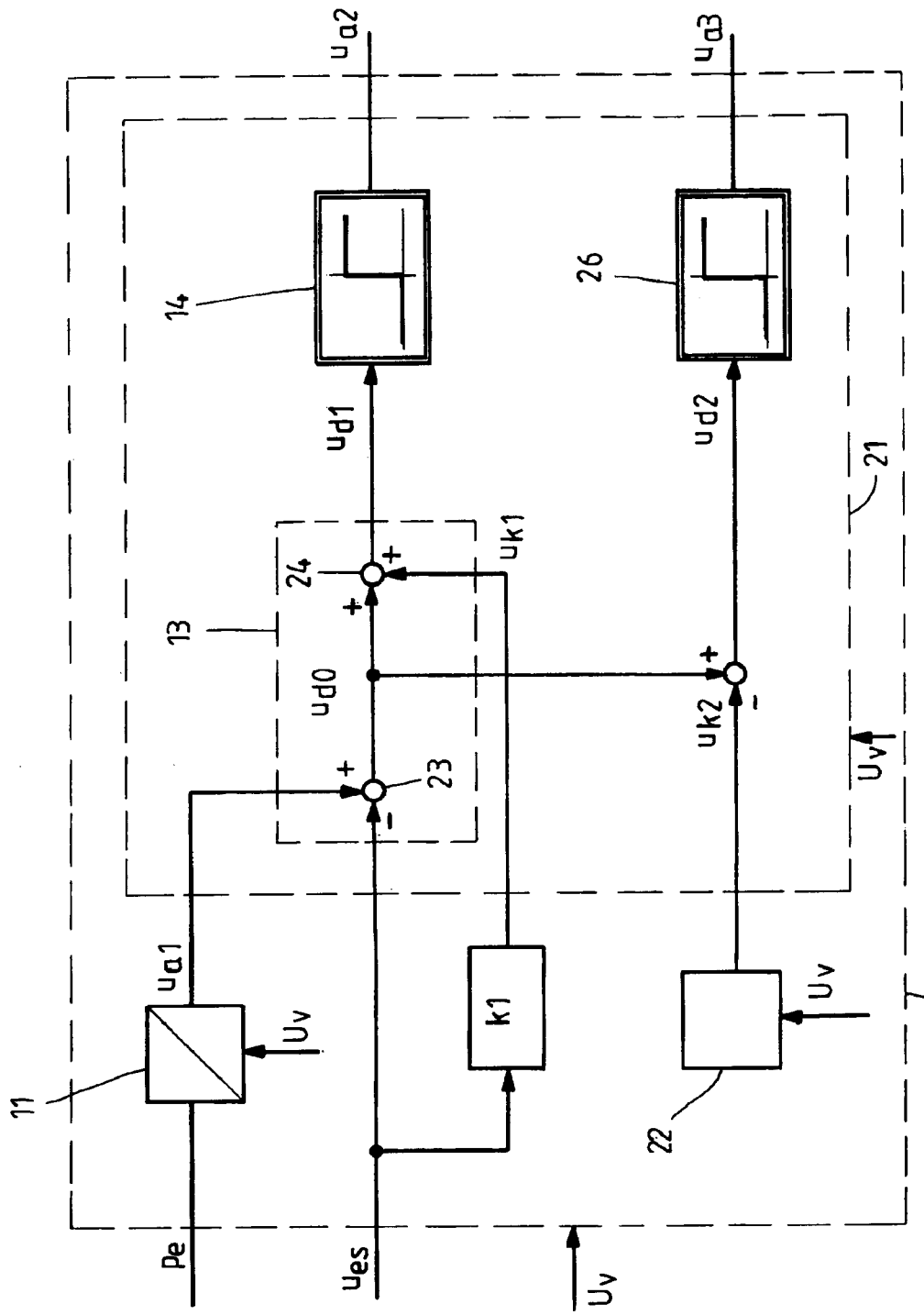
FIG. 2 shows the block diagram of a pressure switch having two electrical switching outputs.

Based on FIG. 1, FIG. 2 shows a pressure switch 20 having two switching outputs. As in FIG. 1, the pressure pe to be monitored is supplied to the pressure sensor 11. The pressure sensor 11 converts the pressure pe to the voltage ua1. The voltage ua1, the voltage ues and the voltage uk1 are supplied as input signals to a logic circuit 21. A voltage uk2 is also supplied, as a second correction signal, to the logic circuit 21. The voltage uk2 is a constant voltage which—for example with the aid of a voltage regulator 22—is derived from the voltage Uv which supplies auxiliary power to the pressure switch 20. The logic circuit 21 has three addition elements 23, 24 and 25, of which the addition elements 23 and 24 correspond, in terms of their effect, to the addition element 13 in FIG. 1. The addition element 23 uses the voltages ues and ua1 to form a voltage ud0, which is supplied not only to the addition element 24 but also to the addition element 25. The addition element 24 uses the voltage ud0 and the voltage uk1 to form the voltage ud1. This voltage is supplied—as in FIG. 1—to the switching element 14, whose output voltage ua2, with the values ua20 or ua21, is the first output signal from the pressure switch 20. As long as the pressure pe which is to be monitored is less than the threshold value ps reduced by the first correction value, the voltage ud1 is negative, and the output voltage ua2 assumes the value ua20. If the pressure pe which is to monitored is greater than the threshold value ps reduced by the first correction value, the voltage ud1 is positive, and the output voltage ua2 assumes the value ua21. The addition element 25 uses the voltages ud0 and the voltage uk2 to form a voltage ud2. The voltage ud2 is supplied to a further switching element 26, which is designed in the same way as the switching element 14. The output signal from the switching element 36 is a voltage ua3, which assumes the value ua30 when the voltage ud2 is negative, and assumes the value ua31 when the voltage ud2 is positive. The voltage ua3, with the values ua30 or ua31, is the other output signal from the pressure switch 20. As long as the pressure pe which is to be monitored is less than the threshold value ps increased by the second correction value, the voltage ud2 is negative, and the output voltage ua3 assumes the value ua30. If the pressure pe which is to be monitored is greater than the threshold value ps increased by the second correction value, the voltage ud2 is positive, and the output voltage ua3 assumes the value ua31. A single threshold value ps in the form of the voltage ues thus makes it possible to monitor the pressure pe both for overshooting a pressure value ps−Δp1, which is reduced below the threshold value ps, and for exceeding a pressure value ps+Δp2, which is increased above the threshold value ps. In this case, the pressure Δp1 corresponds to the voltage uk1, and the pressure Δp2 corresponds to the voltage uk2.

In FIG. 2, the voltage uk2 is a constant voltage. In contrast to this, however, the voltage uk2 may, when required, also be a function of the voltage ues—as explained, by way of example, on the basis of the voltage uk1.

Figure 3:
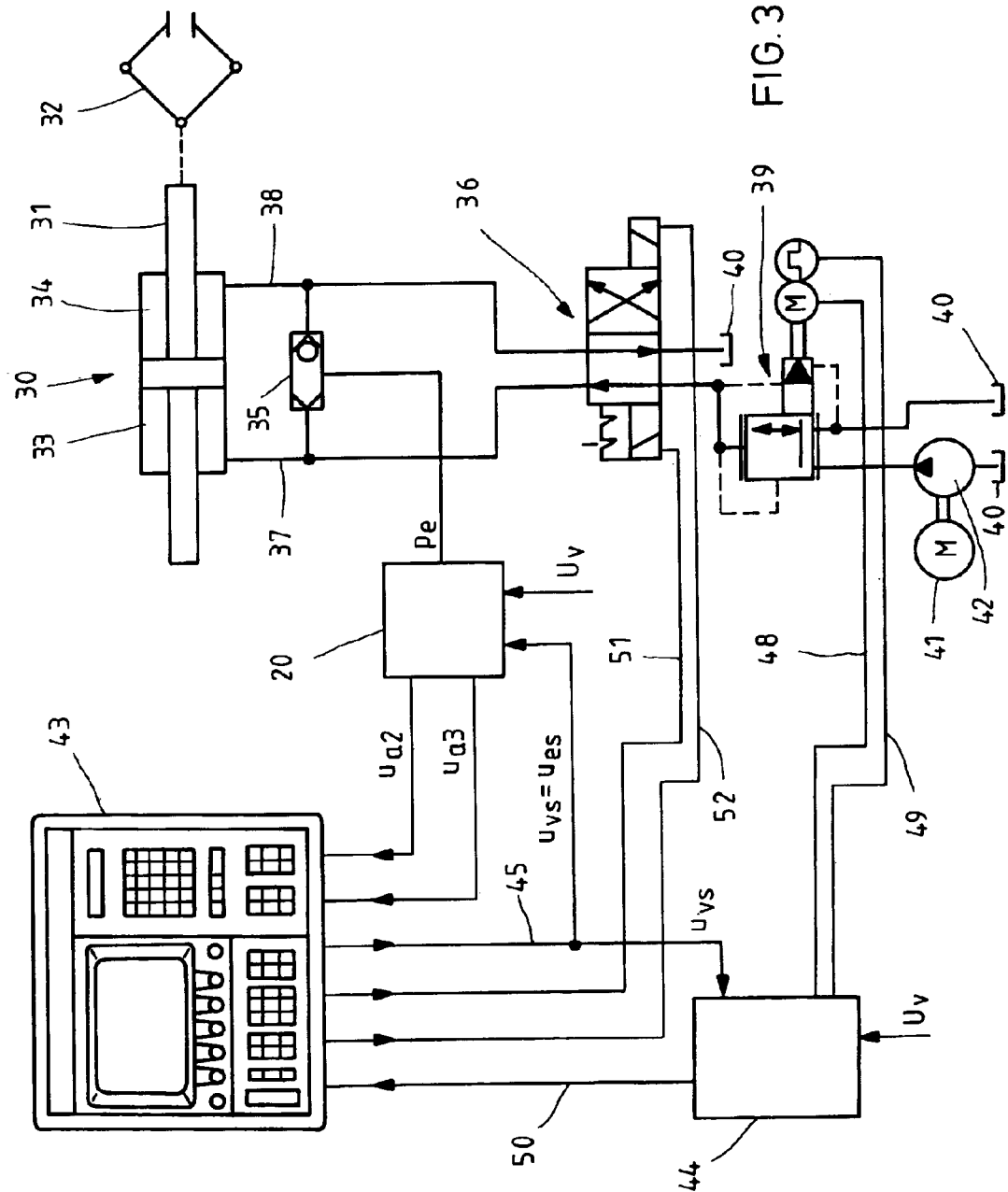
FIG. 3 shows an arrangement for monitoring the operating pressure in a hydraulic clamping system, having one pressure switch which has two switching outputs.

FIG. 3 shows the use of the pressure switch 20, as illustrated in FIG. 2, for monitoring the operating pressure of a hydraulic load for a machine tool. A hydraulic load in the form of a double-acting cylinder 30 operates a chuck 32, which is illustrated only symbolically here, via its piston rod 31. Instead of a chuck, this may also be the tail spindle of a tailstock, for example, which is pressed by the piston rod 31 against a work piece, which is not illustrated in FIG. 3. The chambers of the cylinder 30 are provided with the reference symbols 33 and 34. A changeover valve 35 is connected to the lines 37 and 38, which lead from a switching valve 36 to the chambers 33 and 34 of the cylinder 30. The operating pressure of the clamping apparatus is the higher of the pressures in the chambers 33 and 34. This pressure is supplied to the pressure switch 20, via the changeover valve 35, as the pressure pe which is to be monitored. The switching valve 36 connects one of the chambers 33 and 34 of the cylinder 30 to the output connection of a pilot-controlled pressure regulating valve 39, and connects the respective other chamber 34 or 33 of the cylinder 30 to a tank 40, depending on its position. The pressure regulating valve 39 is connected via a further connection to a pump 42, which is driven by a motor 41, and via a third connection to the tank 40. The pump 42 supplies the pressure medium to the pressure regulating valve 39.

A higher-level machine controller 43 supplies drive electronics 44 for the pressure reducing valve 39, via a line 45, with a voltage uvs as a nominal value signal for the operating pressure to be set for the clamping apparatus. This voltage is at the same time supplied to the pressure sensor 20 as an electrical input signal ues which—as stated above—is a measure of the threshold value. The pressure regulating valve 39 regulates the operating pressure pe of the pressure medium which is supplied to the cylinder 30, in accordance with a control signal which is formed by the drive electronics 44. This control signal is supplied to the pressure regulating valve 39 via a line 48. The output pressure pe from the pressure regulating valve 39 is adjusted by means of a DC drive with closed-loop position control. The position feedback to the drive electronics 44 is provided via a line 49. The position control loop is closed in the drive electronics 44, and there is thus no need for any position feedback to the machine controller 43. The machine controller 43 may be supplied, for example, with status messages from the drive electronics 44 via a line 50, which is arranged between the drive electronics 44 and the machine controller 43.

The switching valve 36 is operated directly by the machine controller 43. Lines 51 and 52 are provided for this purpose, and are routed from the machine controller 43 to the switching valve 36.

The pressure switch 20 monitors the operating pressure independently of the operation of the pressure regulating valve 39, which is adjusted via the drive electronics 44. However, the nominal value signal for valve control and the threshold value of the pressure switch have the same origin. As stated above, the voltage uvs is supplied as an electrical input signal ues to the pressure switch 20. The output signals ua2 and ua3 from the pressure switch 20 are supplied as binary input signals to the machine controller 43. The machine controller 43 evaluates the output signals ua2 and ua3 from the pressure switch 20. If the permissible ranges, which are governed by the voltages uk1 and uk2 from the pressure switch 20, are exceeded, the machine controller 43 initiates corrective measures, which change the machine tool to a safe state. In this case, it is advantageous for the drive for the pressure regulating valve 39 to operate with automatic locking, that is to say, if the electrical control signal for the pressure regulating valve 39 fails, for example due to a discontinuity in the line 48, the last pressure setting is maintained.

The use of the pressure switch according to the invention is not restricted to the examples mentioned above. The pressure switch according to the invention may be used wherever pressure monitoring is required.

What is claimed is:

1. A pressure switch, which emits an electrical switching signal as a function of magnitude of a pressure which is supplied thereto, which electrical switching signal assumes a first value when the pressure is less than an adjustable threshold value, and assumes a second value when the pressure is greater than the threshold value, wherein:

the pressure (pe) is supplied to a pressure sensor (11) which emits an electrical output signal (ua1) which is a measure of the pressure (pe);

the pressure switch (10, 20) is supplied with an electrical input signal (ues) which is a measure of the threshold value (ps);

the electrical output signal (ua1) from the pressure sensor (11) and the electrical input signal (ues) are supplied to a logic circuit (12; 21), which then emits an electrical switching signal (ua2) which assumes one of two values (ua20, ua21) as a function of magnitude of difference between the electrical signals (ua1, ues) which are supplied thereto; and the logic circuit (12; 21) is supplied with an electrical correction signal (uk1) which shifts the pressure at which a switching process takes place with respect to the threshold value (ps) which is predetermined by the electrical input signal (ues).

2. The pressure switch as claimed in claim 1, wherein the correction signal (uk1) increases the pressure at which the switching process takes place with respect to the threshold value (ps) which is predetermined by the electrical input signal (ues).

3. The pressure switch as claimed in claim 1, wherein the correction signal (uk1) reduces the pressure at which the switching process takes place with respect to the threshold value (ps) which is predetermined by the electrical input signal (ues).

4. The pressure switch as claimed in claim 1, wherein the correction signal (uk1) is constant.

5. The pressure switch as claimed in claim 1, wherein the correction signal (uk1) is a function of the electrical input signal (ues).

6. The pressure switch as claimed in claim 5, wherein the correction signal (uk1) is proportional to the electrical input signal (ues).

7. The pressure switch as claimed in one of claims 3, wherein the logic circuit (21) is supplied with a second correction signal (uk2), which increases the pressure at which the switching process takes place with respect to the threshold value (ps) of the pressure switch (20) which is predetermined by the electrical inputs (ues), and the logic circuit (21) forms a second electrical switching signal (ua3) from the electrical output signal (ua1) from the pressure sensor (11), the electrical input signal (ues) and the second correction signal (uk2).

8. The pressure switch as claimed in claim 7, wherein the second electrical switching signal (ua3) changes from a first value (ua30) to a second value (ua31) when the electrical output signal (ua1) from the pressure sensor (11) is greater than sum of the electrical input signal (ues) and the second correction signal (uk2).

9. The pressure switch as claimed in claim 8, wherein the second correction signal (uk2) is a constant voltage, which is derived from a supply voltage (Uv) which is supplied to the pressure switch (20).

10. The pressure switch as claimed in claim 1, comprising the steps of using the pressure switch for monitoring operating pressure of a hydraulic load for a machine tool, particularly in clamping systems with a hydraulic cylinder for operating a chuck or tail spindle of a tailstock.

11. Arrangement for monitoring operating pressure of a hydraulic load (30) for a machine tool, particularly in clamping systems with a hydraulic cylinder for operating a chuck or tail spindle of a tailstock, comprising an electrically operated valve (39) for controlling pressure of pressure medium which is supplied to the hydraulic load (30), drive electronics (44) for the valve (39), a machine controller (43) at a higher level than those, and a pressure switch (10; 20) as claimed in claim 15, with the pressure switch (10; 20) being connected between the valve (39) and the hydraulic load (30), a nominal value signal (uvs) which is supplied to the drive electronics (44) for the valve (39) from the higher-level machine controller (43) being supplied to the pressure switch (10; 20) as the electrical input signal (ues), and the electrical switching signal (ua2) from the pressure switch (10; 20) being supplied to the higher-level machine controller (43).

12. Arrangement for monitoring operating pressure of a hydraulic load (30) for a machine tool, particularly in clamping systems with a hydraulic cylinder for operating a chuck or tail spindle of a tailstock, comprising an electrically operated valve (39) for controlling pressure of pressure medium which is supplied to the hydraulic load (30), drive electronics (44) for the valve (39), a machine controller (43) at a higher level than those, and a pressure switch (10; 20) as claimed in claim 21, with the pressure switch (10; 20) being connected between the valve (39) and the hydraulic load (30), a nominal value signal (uvs) which is supplied to the drive electronics (44) for the valve (39) from the higher-level machine controller (43) being supplied to the pressure switch (10; 20) as the electrical input signal (ues), and the electrical switching signal (ua2) from the pressure switch (10; 20) being supplied to the higher-level machine controller (43) and wherein, the second electrical switching signal (ua3) from the pressure switch (20) is supplied to the higher-level machine controller (43).

* * * * *